(12) United States Patent
McGeer et al.

(10) Patent No.: US 7,857,598 B2
(45) Date of Patent: Dec. 28, 2010

(54) VARIABLE-TWIST ROTOR BLADE CONTROLLED BY HUB PITCH ANGLE AND ROTATIONAL SPEED

(75) Inventors: Brian T. McGeer, Underwood, WA (US); Andreas H. von Flotow, Hood River, OR (US)

(73) Assignee: Aerovel Corporation, White Salmon, WA (US)

( * ) Notice: Subject to any disclaimer, the term of this patent is extended or adjusted under 35 U.S.C. 154(b) by 880 days.

(21) Appl. No.: 11/756,336

(22) Filed: May 31, 2007

(65) Prior Publication Data

US 2010/0014981 A1    Jan. 21, 2010

Related U.S. Application Data

(60) Provisional application No. 60/805,831, filed on Jun. 26, 2006.

(51) Int. Cl.
*B64C 11/34* (2006.01)
(52) U.S. Cl. ...................................... 416/240
(58) Field of Classification Search ................. 416/240, 416/52, 62, 80, 81, 139, 144, 147
See application file for complete search history.

(56) References Cited

U.S. PATENT DOCUMENTS

| | | | |
|---|---|---|---|
| 1,967,461 A | 7/1934 | Ballew | |
| 2,161,699 A | 6/1939 | De La Cierva | |
| 2,248,218 A | 7/1941 | Daniels | |
| 2,644,536 A * | 7/1953 | Kelley | 416/240 |
| 2,584,663 A | 2/1962 | Bensen | |
| 3,275,082 A | 9/1966 | Stark | |
| 4,083,651 A | 4/1978 | Cheney, Jr. et al. | |
| 4,291,235 A * | 9/1981 | Bergey et al. | 416/240 |
| 4,392,781 A | 7/1983 | Mouille et al. | |
| 5,505,589 A * | 4/1996 | Bergey | 416/147 |
| 6,497,385 B1 | 12/2002 | Wachspress et al. | |

OTHER PUBLICATIONS

International Search Report (PCT/US07/71663) dated Aug. 29, 2008.
Multiple Design Point Optimization of High Speed Proprotors, written by Chattopadhyay et al., J. Aircraft, vol. 333, No. 3: Engineering Notes, p. 625-27, published Jan. 1996.
A Summary of Wind Tunnel Research on Tilt-Rotors from Hover to Cruise Flight, written by Poisson-Quinton et al., NASA TM-X-68948, published Jan. 1, 1972.

(Continued)

*Primary Examiner*—Richard Edgar
(74) *Attorney, Agent, or Firm*—K&L Gates LLP

(57) ABSTRACT

The twist distribution of torsionally-flexible rotor blades is adjusted by exploiting centrifugal effect on inertial torquers affixed at one or more stations along the blade span. Twist is thereby made to vary passively as a function of rotor speed and hub incidence angle. With inertias of appropriate size and location, the twist variation is such that high rotor efficiency is maintained over a wide range of operating conditions. Satisfactory dynamic behavior of the blade, including cyclic-pitch response and flutter resistance, is simultaneously achieved.

59 Claims, 12 Drawing Sheets

OTHER PUBLICATIONS

Characterization of SMA Torsional Actuators for Active Twist of Tilt Rotor Blades, written by Prahlad et al., 43$^{rd}$ AIAA/ASME/ASCE/AHS/ASC Structures, Structural Dynamics, and Materials Conference, published Apr. 2002.

Design of a Variable Twist Tilt-Rotor Blade using Shape Memory Alloy (SMA) Actuators, written by Prahlad et al, Smart Structures and Materials 2001: Smart Structures and Integrated Systems, Proc. SPIE vol. 4327, published Aug. 2001.

Heliogyro Solar Sailer Summary Report, written by MacNeal et al., NASA CR-1329, published Jun. 1, 1969.

Lithium Rechargeable Batteries as Electromechanical Actuators, written by Chin et al, Electrochemical and Solid-State Letters, 9, A134, published Jan. 18, 2006.

Optimum Design of High Speed Prop-Rotors Report, written by Aditi Chattopadhyay, NASA-CR-190915, published Oct. 12, 1992.

Performance Enhancement of a Composite Tilt Rotor using Aeroelastic Tailoring, written by Soykasap et al., Journal of Aircraft, vol. 37, No. 5, Sep.-Oct. 2000, p. 850-58, published Oct. 2000.

The Effect of Ribbon Rotor Geometry on Blade Response and Stability, Masters Thesis, written by William G Roeseler, 1966.

* cited by examiner

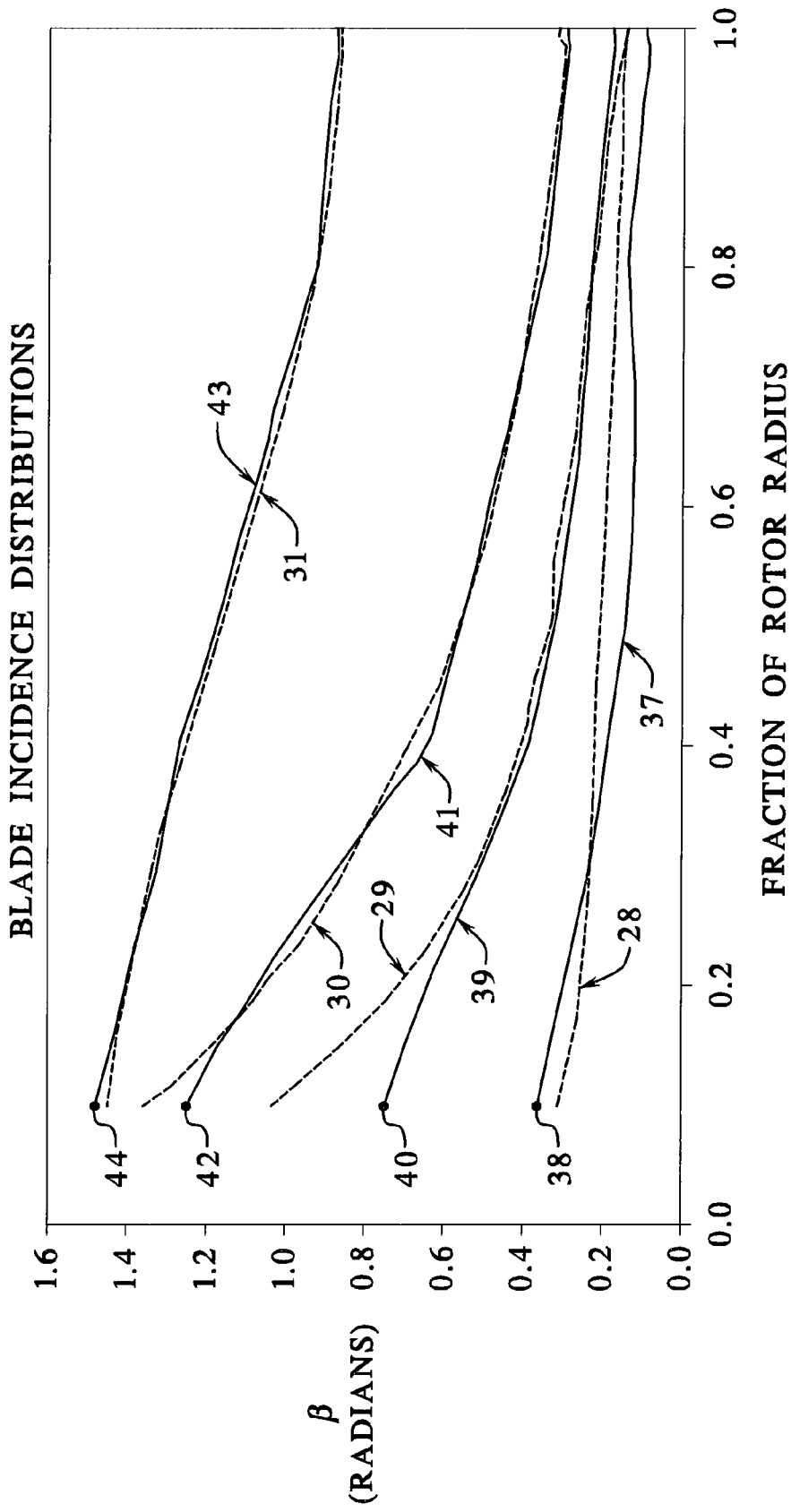

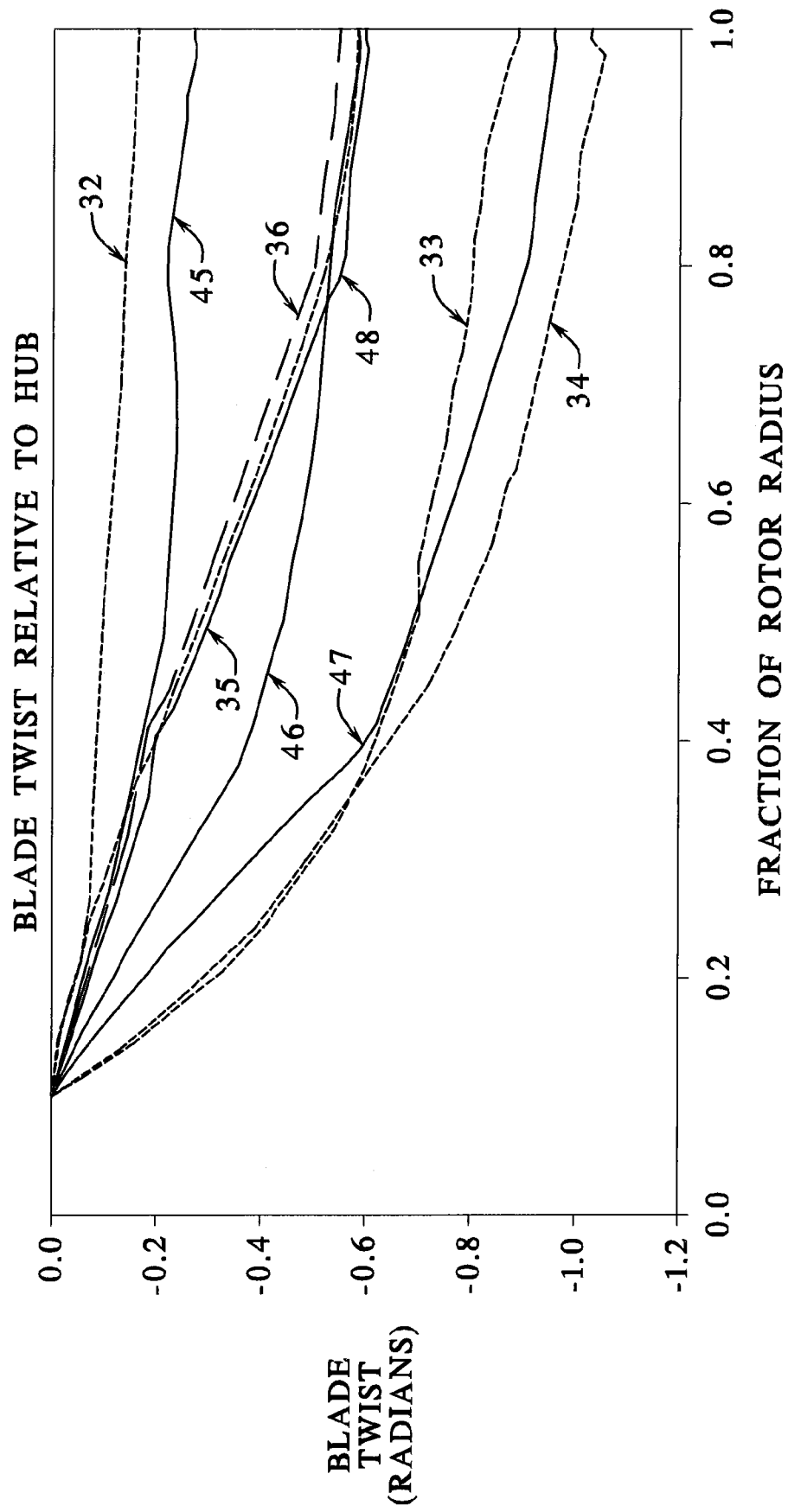

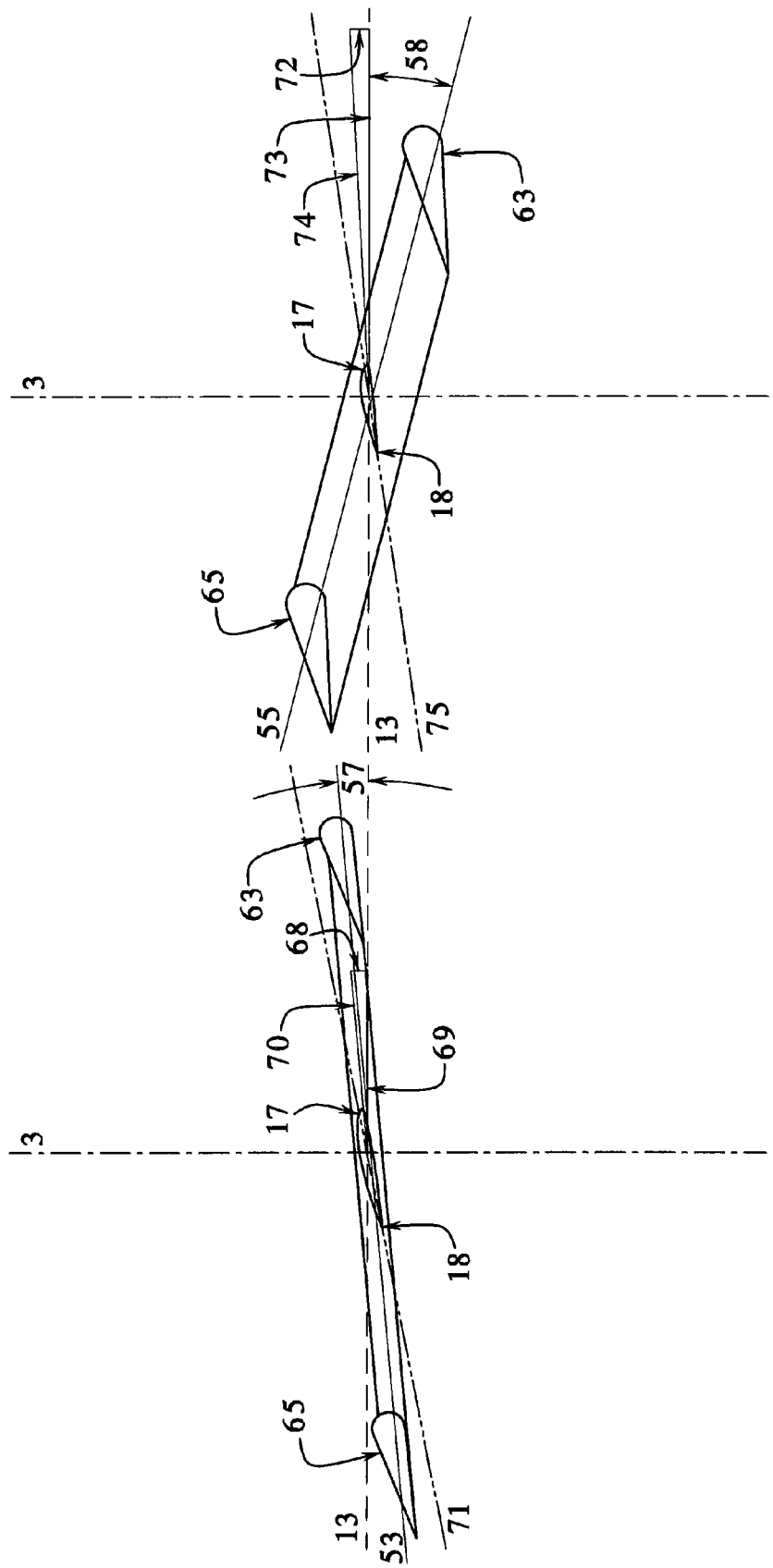

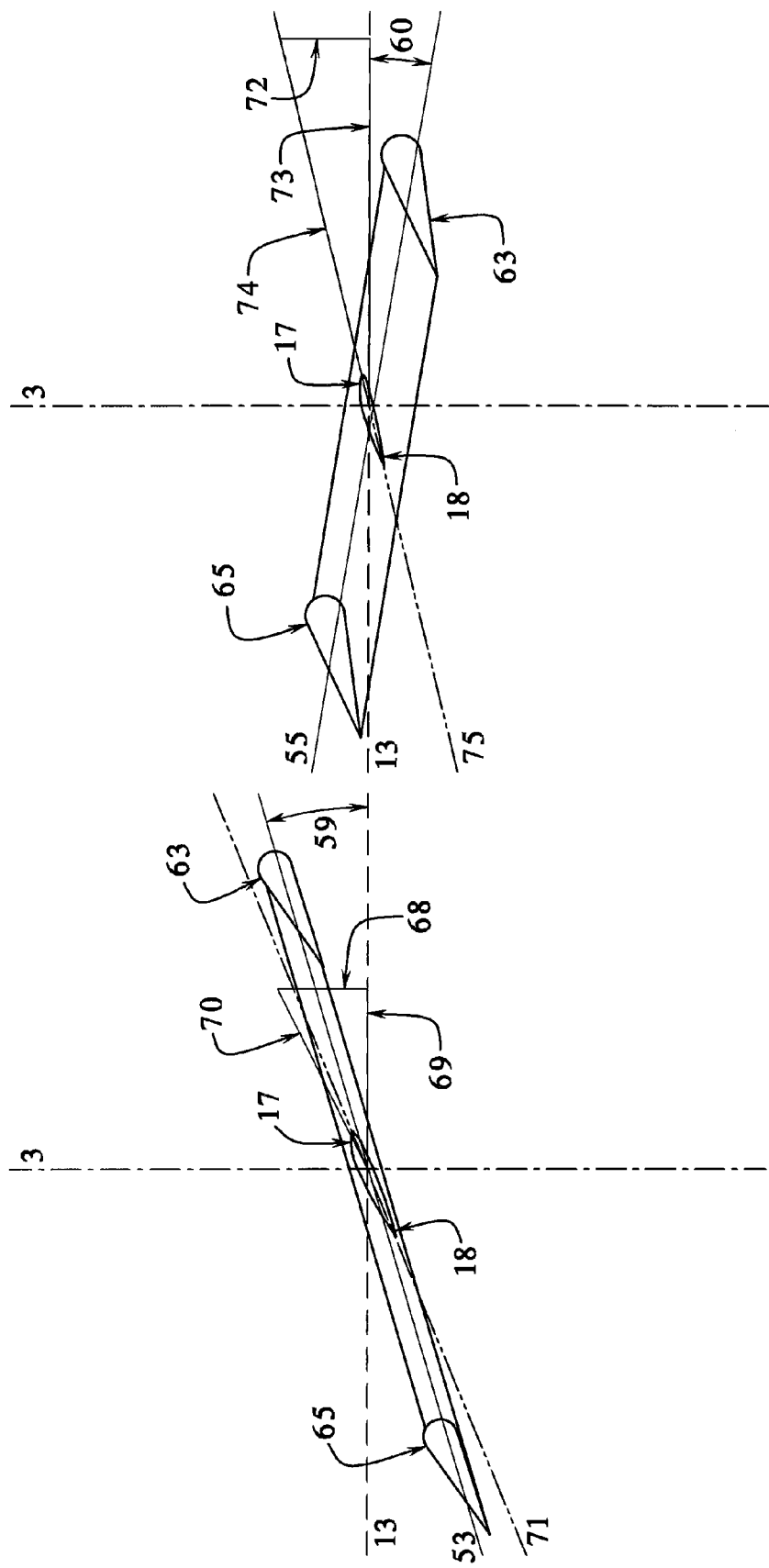

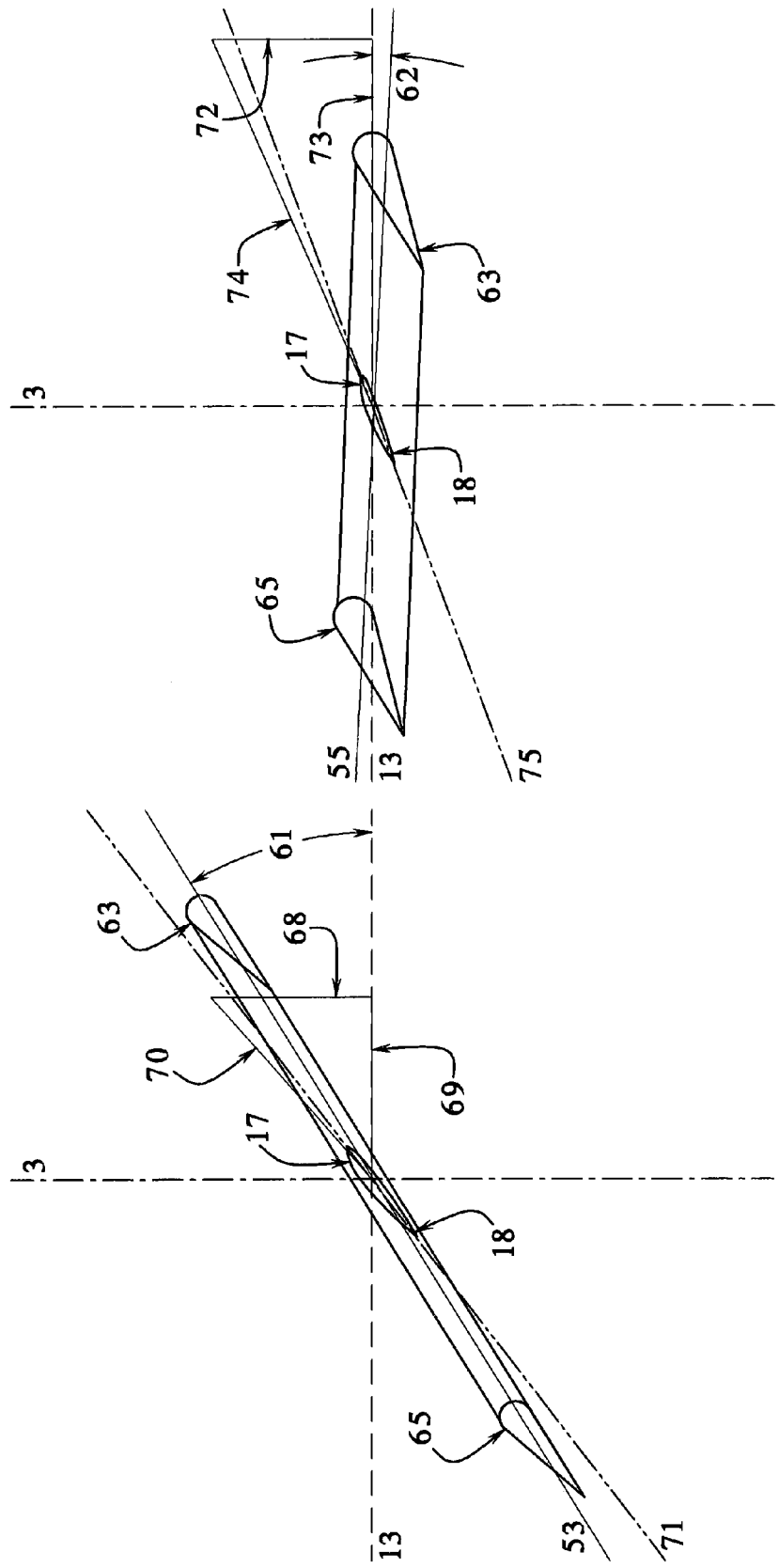

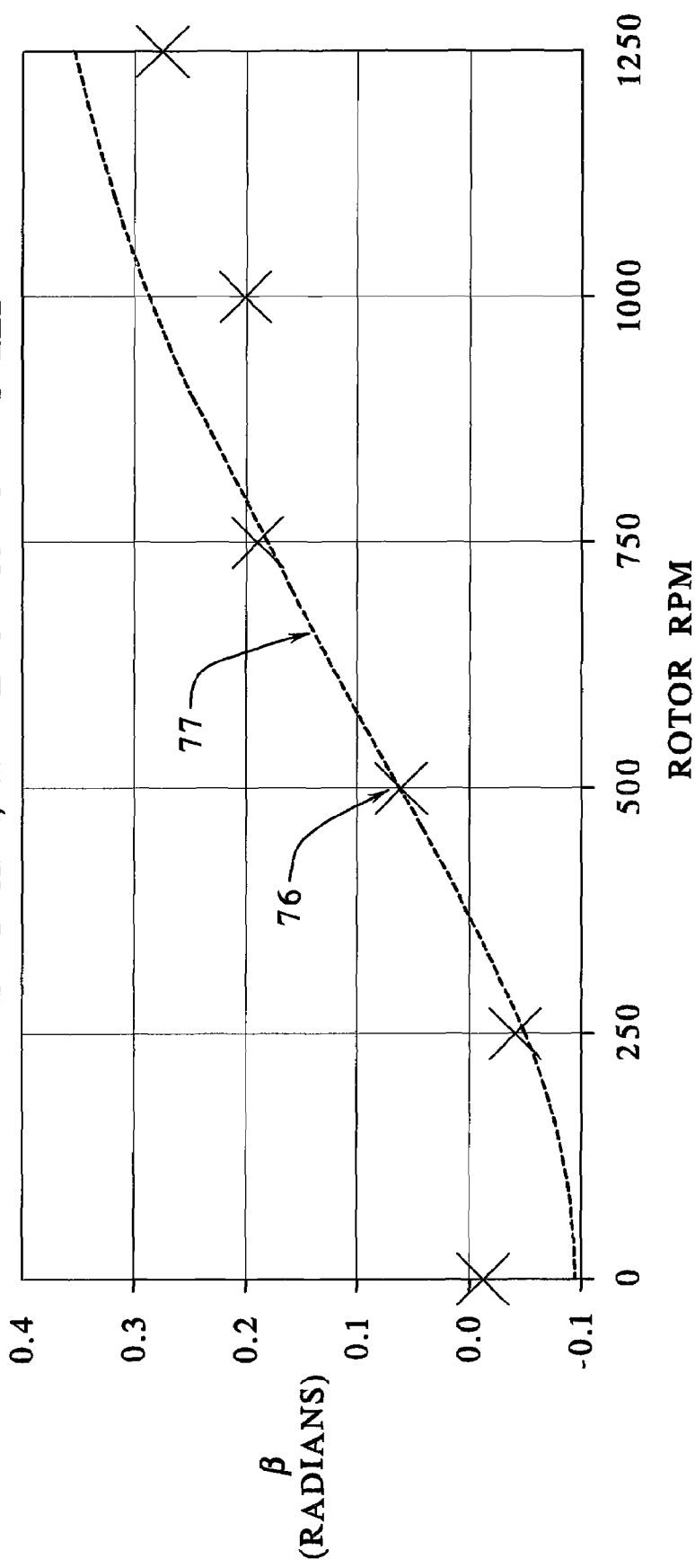

VARIABLE-TWIST ROTOR BLADE CONTROLLED BY HUB PITCH ANGLE AND ROTATIONAL SPEED

PRIORITY CLAIM

This application is a non-provisional of, claims priority to and the benefit of U.S. Provisional Patent Application Ser. No. 60/805,831, filed Jun. 26, 2006, the entire contents of which are incorporated herein by reference.

NOTICE OF GOVERNMENT RIGHTS

This invention was made with U.S. Government support under Contract No. W31P4Q-06-C-0043, effective Nov. 23, 2005 ("the contract") issued by U.S. Army Aviation and Missile Command. The U.S. Government has certain rights in the invention. More specifically, the U.S. Government has a paid-up license in this invention and the right in limited circumstances to require the patent owner to license others on reasonable terms as provided for by the terms of the contract.

BACKGROUND

The present invention addresses the configuration of propellers, rotors, and windmills (including wind turbines), particularly those which must operate over a wide range of speeds and power settings. Such rotors must be able to vary both hub pitch and blade twist to avoid significant penalties in performance over much of their operating envelope. One method of the present invention described herein entails making the body of the blade flexible in twist, and using inertial torquers having relatively small fixed masses at one or more radial stations to generate twisting torques through centrifugal effect. With suitable choice of size, shape and location of the affixed masses in accordance with the present invention, a blade can be made to adopt near-ideal twist over a wide range of rotational speeds and hub-pitch angles.

The value of a variable-pitch, variable-twist rotor blade can be explained with reference to FIG. 3, which shows the airflow incident upon a typical blade section. For maximum rotor efficiency—that is, thrust generation with minimum power—the angle of attack α between the blade-section chord line 24 and the relative-wind vector V must fall within a narrow operating range, typically only a few degrees. If the angle of attack is outside of this range, then the blade will generate unnecessarily high drag, and correspondingly high power will be required to generate a desired thrust.

As FIG. 3 indicates, the relative-wind vector is the sum of a component $V_t$ due to the blade's spin about the axis of the rotor, and a component $V_x$ due to inflow along the spin axis of the rotor. For illustration, imagine a propeller-driven aircraft. At low forward speed, for example while accelerating for take-off, $V_x$ is relatively small. Hence, the relative-wind vector makes a relatively shallow angle with the propeller's plane of rotation, and the incidence β of the blade section (i.e., the angle between the chord line and the plane of rotation) must likewise be shallow to put the angle of attack in the range for high efficiency. (The blade is then said to have "flat" or "fine pitch.") At high forward speed, for example in cruise flight, $V_x$ is relatively large. In this condition, the incidence of the blade must be made steeper if the ideal angle of attack is to be achieved. (The blade would then be said to have "coarse pitch".)

Now consider the ideal variation of section incidence from hub to tip across the blade. The rotational component of inflow $V_t$ is small at the hub and large at the tip. Meanwhile, the axial component $V_x$ varies little across the blade. Hence, the inflow angle is steeper at the hub and shallower at the tip. If an ideal angle of attack is to be achieved on each blade section, then the blade must be twisted to match the inflow angle, with steeper incidence at the hub, and shallower incidence toward the tip. The ideal twist (i.e., difference in incidence between hub and tip blade sections) varies with the operating condition. An example is given in FIG. 5. The ideal twist (as well as the hub incidence) is relatively small at low forward speed (28), and relatively large at high forward speed (31).

Rotors which must operate over a wide range of speeds, as is typical for both propellers and windmills, would thus ideally have a mechanism to vary both hub incidence and blade twist in order to achieve optimum efficiency. But "fixed-pitch" propellers, as fitted to many aircraft, boats, and windmills, have no such mechanism. Their incidence is fixed, so they have high efficiency only in a narrow speed range. "Variable-pitch" propellers, which are also common, widen the range of efficient operation by varying hub pitch, but not twist. (That is, they have a mechanism to rotate the whole blade as a rigid unit about the hub.) An aircraft with a variable-pitch propeller typically has a better combination of climb and cruise performance than can be realized with fixed pitch. However, lack of a mechanism for varying twist can still be a large handicap.

The problem is particularly acute for aircraft such as "tilt-rotors" and "tail-sitters," whose operating range extends from hover, with rotors thrusting vertically at zero axial speed, to forward flight, with rotors thrusting horizontally at high axial speed. Hover calls for flat hub incidence and little twist, while fast forward flight calls for coarse hub incidence and much more twist. Tilt-rotor aircraft built to date have variable-pitch rotors with fixed twist. As a result, even when hub incidence is adjusted for best performance in each condition, the inner part of a tilt-rotor blade may be left stalled in hover, and thrusting backward in forward flight. Rotor efficiency is thereby significantly penalized in both conditions.

Various methods have been proposed over the last half-century to avoid this penalty by making twist variable. These methods may be classified as either "active" or "passive."

"Active" methods use mechanically-activated or electrically-activated devices along the blade to vary its shape. These include arrangements of torque-tubes and linkages, or of shape-memory or bistable materials, to adjust flexible or articulated blade sections. Such methods suffer from being heavy, costly, and complex to implement.

"Passive" methods are simpler. One such method is extension-twist coupling. A rotor blade can be built, for example with composite fibers laid at an appropriate angle to the spanwise axis, so that a change in axial tension causes twist. On some tilt-rotor aircraft, rotor speed and thus centrifugal tension is changed significantly between hover and forward flight. Hence, a blade of suitable construction can be made to change twist as desired between the two conditions. In practice, however, there may be little or no change in rotor speed between operating conditions requiring very different twist, as for example between hover and forward-flight climb. Extension-twist coupling is not effective in such situations.

Another mechanism for varying twist by centrifugal effect exploits the tendency of a set of spinning masses to maximize their aggregate moment of inertia about the spin axis. Thus, a mass element added to a blade will generate a torque that tends to align the principal axis of the element with the rotor's plane of rotation. The torque increases with the square of rotor speed. This "inertia-maximizing" effect from external bob-weights is used in various ways on propellers and windmills.

Most notably, it is used for passive regulation of windmills, over a wide range of wind speed, without the need for a hub-pitch mechanism. Bob-weights affixed near the tips of torsionally-flexible blades cause twisting as rotor speed changes, and thus adjust the blade load. Another proposed use involves attaching actively-moveable bob-weights along the span of a torsionally-flexible blade. A servo would command changes in the location of each weight relative to the blade, and so modulate the inertia-maximizing torque in order to vary twist. As with other active techniques for blade twist variation, this involves cost and complexity in implementation.

SUMMARY

One embodiment of the present invention uses the inertia-maximizing effect to provide the simplicity and economy of passive twist variation, while covering a more varied operating envelope than do other passive methods such as extension-twist coupling. One embodiment of the present invention combines the following elements in a blade:
1. torsionally-flexible rotor body;
2. one or more mass elements ("inertial torquers") mounted externally at stations along the body;
3. variable hub incidence; and
4. variable rotor speed.

By appropriate choice of the built-in twist of the blade's body; the body's torsional stiffness; the number, size, and position of the inertial torquers; and the hub-incidence schedule, high rotor efficiency can be achieved over a broad range of rotor and flight speeds. The inertial torquers add only modestly to blade mass and drag. Moreover, they need not compromise flutter behavior, or response to cyclic (once-per-revolution) hub-pitch control as used on helicopters.

The figures and detailed description will explain these features and advantages more fully.

BRIEF DESCRIPTION OF THE FIGURES

FIG. 5 is a graph of blade-section incidence versus radial station, showing with broken traces the ideal incidence distributions (i.e., incidence angle as a function of radial station along the blade) for several example operating conditions, and with solid traces, the incidence distributions achieved by a rotor blade constructed in accordance with one embodiment of the present invention.

FIG. 6 is a graph of blade-section twist vs radial station, showing with broken traces the ideal twist distributions for several example operating conditions, and with solid traces, the twist distributions achieved by a rotor blade constructed in accordance with one embodiment of the present invention.

FIGS. 8A and 8B are a pair of cross-sectional views taken along 1-1 and 3-3 in FIG. 1, showing the orientation of inner and outer inertial torquers when the rotor is operating in hover.

FIGS. 9A and 9B are a pair of cross-sectional views taken along 1-1 and 3-3 in FIG. 1, showing the orientation of inner and outer inertial torquers when the rotor is operating in high-speed dash.

FIGS. 10A and 10B are a pair of cross-sectional views taken along 1-1 and 3-3 in FIG. 1, showing the orientation of inner and outer inertial torquers when the rotor is operating in low-speed climb.

FIG. 12 is a plot of section incidence at 82% radius on a test blade, both as predicted and as measured as a function of rotor rotational speed, at zero forward speed and with fixed hub incidence.

DETAILED DESCRIPTION

Figure 1:
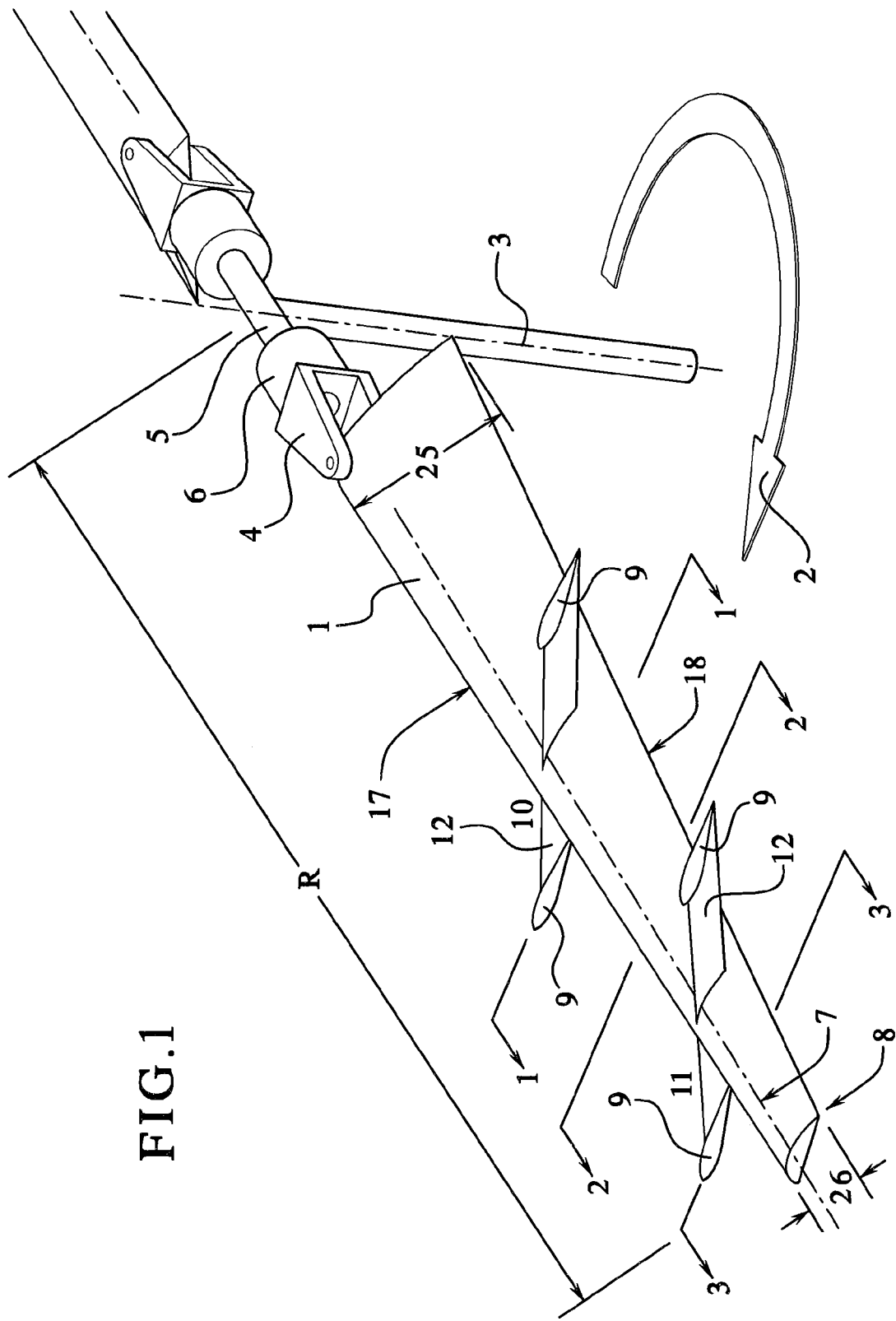
FIG. 1 is a perspective view of a rotor blade assembly constructed according to on embodiment of the present invention.

FIG. 1 illustrates one embodiment of a variable-pitch variable-twist rotor. One or more blades 1 rotate left-handedly as indicated by arrow 2 about the spin axis 3 of the rotor. The rotor head 5 has a mechanism to vary the incidence of each blade hub 4 both "collectively" and "cyclically"—that is, by a collective amount which is invariant during a rotation of the blade around the spin axis, and a cyclic amount which varies sinusoidally with azimuth angle during rotation around the spin axis. (Configurations of mechanisms for collective and cyclic pitch variation are well known in the art and need not be described or illustrated in detail herein.) The body of blade 1 is flexible in torsion about an axis 7 running from the hub 4 to the tip 8. The tip 8 is at radius R from the spin axis 3. In the embodiment of FIG. 1, inertial torquers 10 and 11 including bob masses 9 are attached by struts 12 at two stations along the body of the blade 1, for example at 40% and 80% of rotor radius R. It should be appreciated that one or more inertial torquers, at various body stations, could be installed in other embodiments.

Figure 2:
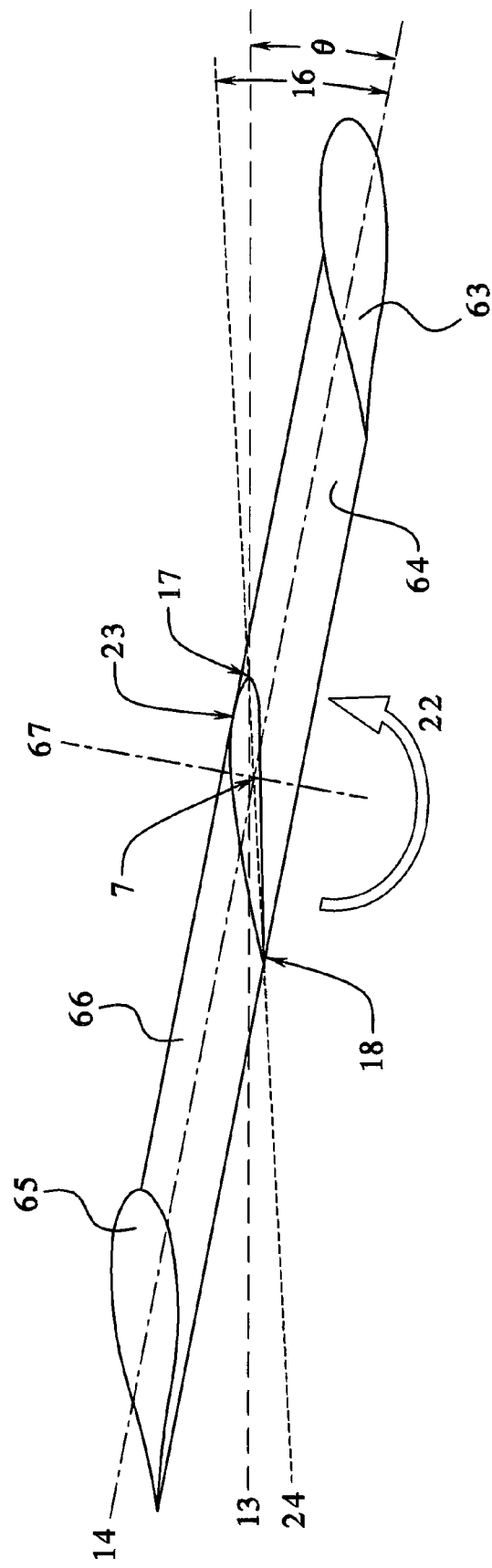
FIG. 2 is a cross-sectional view taken substantially along 1-1 in FIG. 1, showing an inertial torquer attached to the rotor blade in accordance with one embodiment of the present invention.

FIG. 2 shows one embodiment of an inertial-torquer installation in sectional view. In this embodiment leading and trailing bob-masses 63 and 65 are attached by struts 64 and 66 respectively forward and aft of the blade body's spanwise elastic axis 7. The principal axis of inertia 14 of the inertial torquer makes an angle 16 (which in general may be positive, negative, or zero depending on the embodiment) relative to the chord line 24 running between the leading edge 17 and trailing edge 18 of the blade section. The torque generated by the assembly scales with $((I_z-I_x)\Omega^2 \sin 2\theta)$, where $\Omega$ is the spin rate of the rotor, $I_x$ and $I_z$ are the moments of inertia of the inertial torquer about its principal axes 14 and 67, and $\theta$ is the angle between the principal axis 14 and the plane of rotation 13. The twisting torque 22 is in the direction that tends to reduce $\theta$ to zero, that is, centrifugal effect stiffens the inertial torquer relative to the plane of rotation 13.

FIG. 12 illustrates the scaling of centrifugal torque with rotational speed. A single inertial torquer was mounted at 82% radius on a torsionally-flexible blade, and the blade was spun at increasing rotational speed while holding the hub at fixed incidence. Forward speed $V_x$ was zero throughout. The hub incidence and configuration of the torquer were such that the blade tip twisted leading-edge up as the rotational speed increased. The measured variation in incidence with rotational speed 76 followed the predicted behaviour 77 so long as the section was not stalled. (At rotational speeds above about 750 rpm, however, the inertial torquer forced the blade into stall. This generated leading-edge-down aerodynamic moments which were not included in the prediction, and which partly counteracted the centrifugal twist produced by the torquer.)

The inertia moments $I_x$, $I_z$ and relative incidence 16 of each inertial torquer are selected to achieve appropriate blade incidence distributions as functions of rotor speed and hub pitch. For any given values of moments $I_x$ $I_z$ and relative incidence 16, various embodiments are possible. The masses 63 and 65 might be made smaller, for example, to reduce total weight of the assembly, but the struts 64 and 66 would then have to be longer and would generate more drag. In any case, it will usually be desirable to make the masses of dense material such as lead or tungsten, and the struts of light material such as aluminum or carbon-fiber, in order to minimize drag of the torquer assembly. Similarly it will usually be desirable, although not necessary, for the masses and struts to be of streamlined shape. The masses 63 and 65 could be identical or different, and be placed at equal or unequal distances from the elastic axis 7. The mass-centre of the whole assembly could be located so as to achieve desirable dynamic behavior of the blade, and in particular to avoid flutter. In certain embodiments, it may be advantageous to eliminate one mass and strut entirely.

Figure 3:
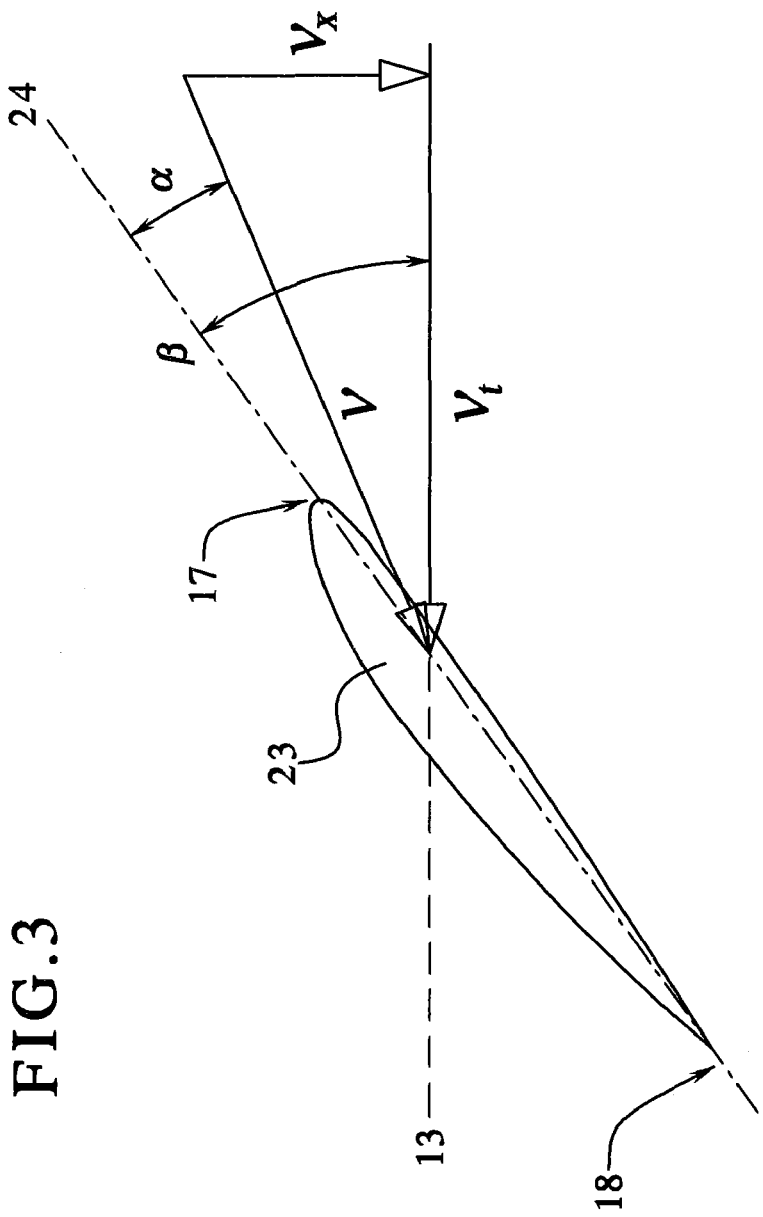
FIG. 3 is a cross-sectional view taken along 2-2 in FIG. 1, showing velocity components incident on a typical blade section while in forward flight.

FIG. 3 shows a relative wind vector V impinging on a blade section. The relative wind is the vector sum of axial $V_x$ and tangential $V_t$ velocity components. For optimum efficiency, the angle of attack $\alpha$ between the relative wind V and the chord line 24 must be within a narrow range. The angle of attack $\alpha$ is adjusted by varying the incidence $\beta$ between the chord line 24 and the plane of rotation 13.

One example embodiment can be used to illustrate the present invention. Many variations are possible. For this example, we use a small tilt-rotor or tail-sitter aircraft having a two-bladed rotor, with 2:1 ratio between hub chord 25 and root chord 26 as shown in FIG. 1. The rotor operates at a tip Reynolds number of about 150,000 (which would be appropriate for a rotor of about 1 meter radius). We consider four representative operating points in the flight envelope of the aircraft, as tabulated below: hover; climb in low-speed forward flight; loiter in low-speed forward flight; and dash in high-speed forward flight. Advance ratio in the table is proportional to the ratio of speed V along the rotor axis to the spin rate $\Omega$ of the rotor.

TABLE 1

| flight condition | advance ratio $\left(\frac{\pi V}{\Omega R}\right)$ | blade loading relative to hover | | |
| --- | --- | --- | --- | --- |
| | | rotor speed $\Omega$ | thrust | power |
| hover | 0 | 1 | 1 | 1 |
| low-speed climb | 0.6 | 1 | 0.21 | 1 |
| high-speed dash | 1.1 | 1 | 0.11 | 1 |
| low-speed loiter | 3.0 | 0.2 | 0.04 | 0.16 |

In hover, the rotor thrusts vertically at zero speed along its axis; hence the advance ratio is zero. Thrust is equal to weight, and the engine is run at high power. Climb, and dash are flown at comparable engine power, and so (with fixed gear ratio between the engine and rotor) at rotor speed comparable to that in hover. Thrust is lower than in hover, and advance ratio is nonzero. Loiter is flown at much lower power, rotor speed, and thrust, and at high advance ratio.

The premium on rotor performance in each condition can readily be appreciated. Hover and climb efficiency determine how much weight can be lifted for a given engine power. This directly determines how much fuel and payload can be carried. Loiter efficiency determines how much power is required for level flight, and so fuel consumption, and so how long the aircraft can remain on station, or how far it can fly. Dash efficiency determines how fast the aircraft can go in level flight. Hence efficiency penalties due to deviation from ideal blade incidence in any operating condition will directly reduce the utility of the aircraft.

Ideal incidence distributions (i.e., those for maximum rotor efficiency) are plotted in FIG. 5 as functions of radial station along the blade: distribution 28 for hover; 29 for climb; 30 for dash; and 31 for loiter. (The ideal incidence distribution for a rotor blade at any selected operating point can be estimated by various analytical techniques that are well known in the art.) Higher advance ratio as listed in Table 1 calls for coarser blade incidence. The ideal twist (i.e., incidence relative to the hub), as plotted in FIG. 6 against radial station, is least in hover 32, larger in climb 33, larger still in dash 34, and then somewhat smaller in loiter 35 despite the steadily increasing advance ratio.

To achieve incidence distributions close to the ideals of FIG. 5 in accordance with the present invention, the designer can adjust one or more of the following:

1. the blade body's distribution of torsional stiffness (27 in FIG. 4);
2. the body's built-in twist distribution (36 in FIG. 6);
3. number and spanwise locations of inertial torquers;
4. size of the bob masses in each inertial torquer;
5. distance of each bob mass from the elastic axis of the body;
6. angle of the principal axis of each inertial torquer relative to the section chord; and
7. hub incidence angle at each operating point.

Figure 4:
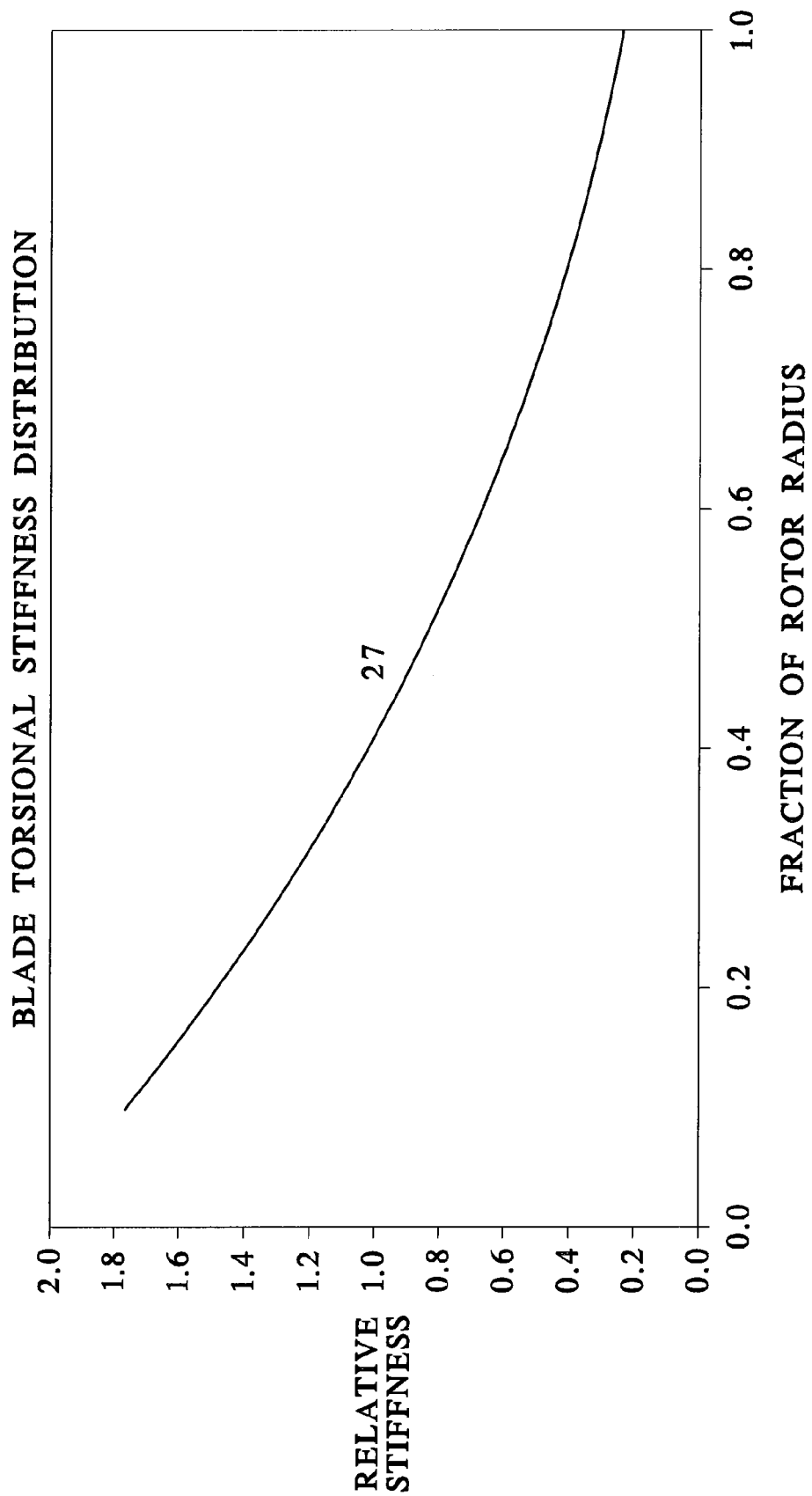
FIG. 4 is a graph of blade-section torsional stiffness vs radial station, in accordance with one embodiment of the present invention.

We assume for illustration that the torsional stiffness distribution 27 scales with the cube of section chord 24 as shown in FIG. 4 (as would be the case if the blade 1 were built as a thin-walled tube with uniform skin thickness). Values for the remaining design parameters can be selected by various techniques, for example, by numerical search to optimize a weighted sum of performance figures-of-merit for the four operating conditions of interest.

Figure 7A:
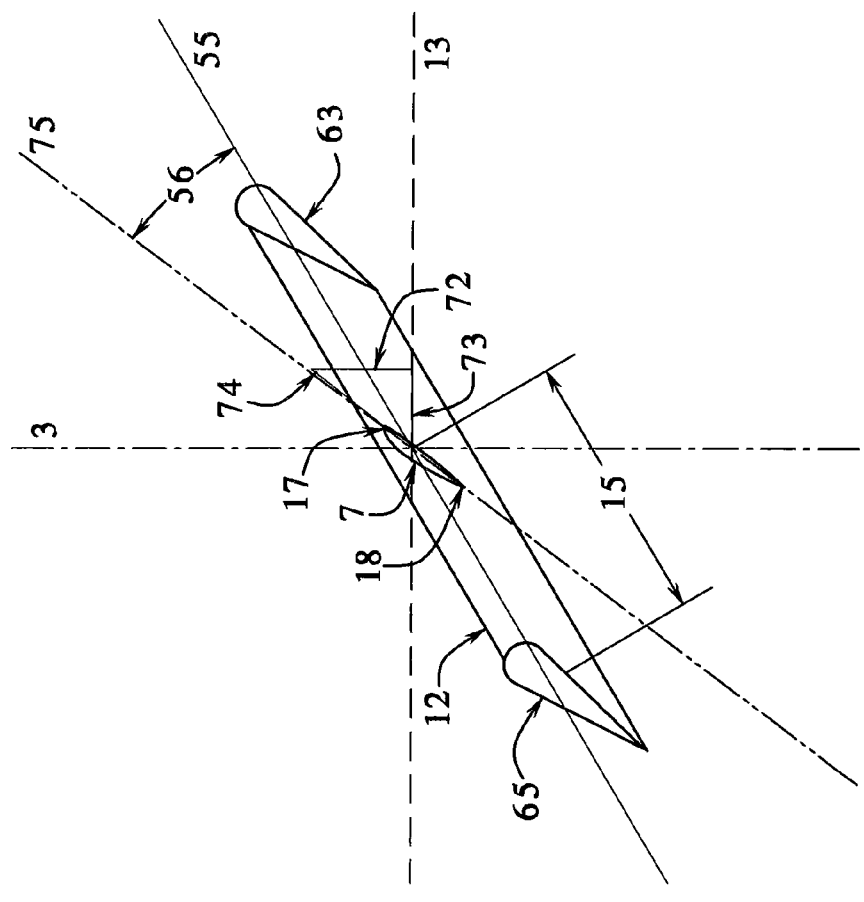
FIGS. 7A and 7B are a pair of cross-sectional views taken along 1-1 and 3-3 in FIG. 1, showing the orientation of inner and outer inertial torquers when the rotor is operating in low-speed loiter.
Figure 7B:
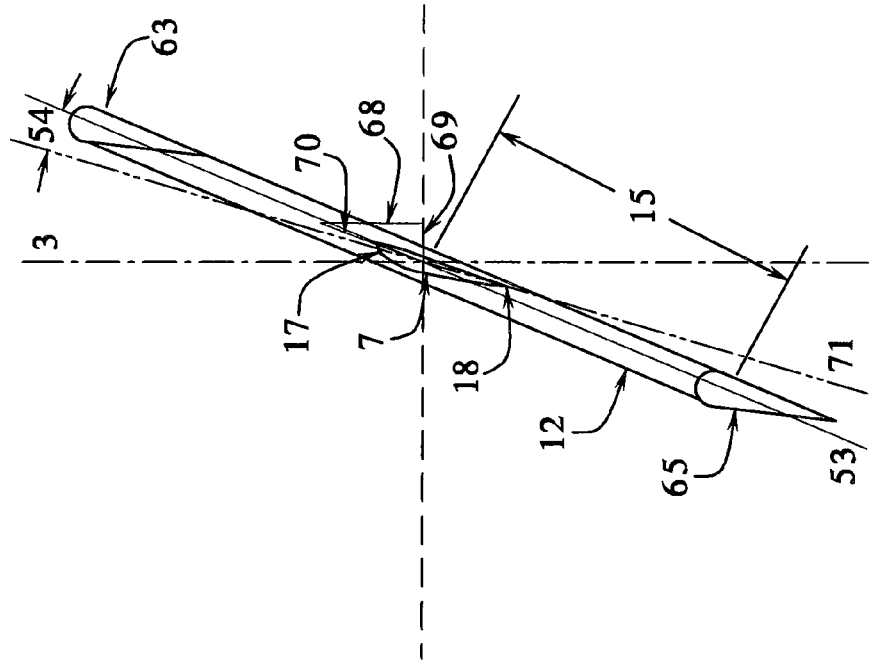

For this example, we use two inertial torquers as depicted in FIG. 1 and in FIG. 7, with the inner torquer 10 at about 40%, and the outer torquer 11 at about 80% of rotor radius R. The distance 15 of each bob mass from the elastic axis 7 is chosen as a compromise, with small distance calling for large masses and hence a relatively heavy rotor, and large distance on the other hand making the inertial torquer unwieldy. The inner inertial torquer is mounted with its principal axis 53 at a shallow negative incidence 54 relative to its section chord line 71, and the outer inertial torquer is mounted with its principal axis 55 at a larger negative incidence 56 to its section chord line 75. Each inertial torquer is shown in the figures as having equal mass fore and aft of the blade's elastic axis 7. This ensures that the centrifugal torque generated by the assembly is purely pitch-wise. Equal mass on either side of the elastic axis is not necessary, however, and it may indeed be desirable to put more or all of the total mass into the forward weight in order to adjust the threshold for torsional flutter, or to simplify the assembly.

FIG. 5 shows the blade incidence distribution estimated to be achieved by our variable-pitch, variable-twist rotor at each example operating point, in hover 37, climb 39, dash 41, and loiter 43. Each is close to the corresponding ideal incidence distribution. Performance figures-of-merit as tabulated below are likewise estimated to be close to those of a rotor having ideal incidence at each operating point:

TABLE 2

| flight condition | advance ratio | estimated figure of merit | | incidence (see FIG. 5) | |
|---|---|---|---|---|---|
| | | ideal incidence | achieved incidence | ideal incidence | achieved incidence |
| hover | 0 | 0.71 | 0.71 | 28 | 37 |
| low-speed climb | 0.6 | 0.78 | 0.76 | 29 | 39 |
| high-speed dash | 1.1 | 0.73 | 0.70 | 30 | 41 |
| low-speed loiter | 3.0 | 0.90 | 0.90 | 31 | 43 |

Figure-of-merit here is as conventionally defined in the art, being equal to $$\frac{T}{P}\sqrt{\frac{T}{2\rho A}}$$

for hover, and for $$\frac{TV}{P}$$

forward flight, where T is the thrust generated by the rotor, P is the power absorbed, V is the speed along the spin axis, ρ is the density of air, and A is the area of the rotor disc, i.e. $\pi R^2$. A value of unity is the physical optimum.

Figure 11:
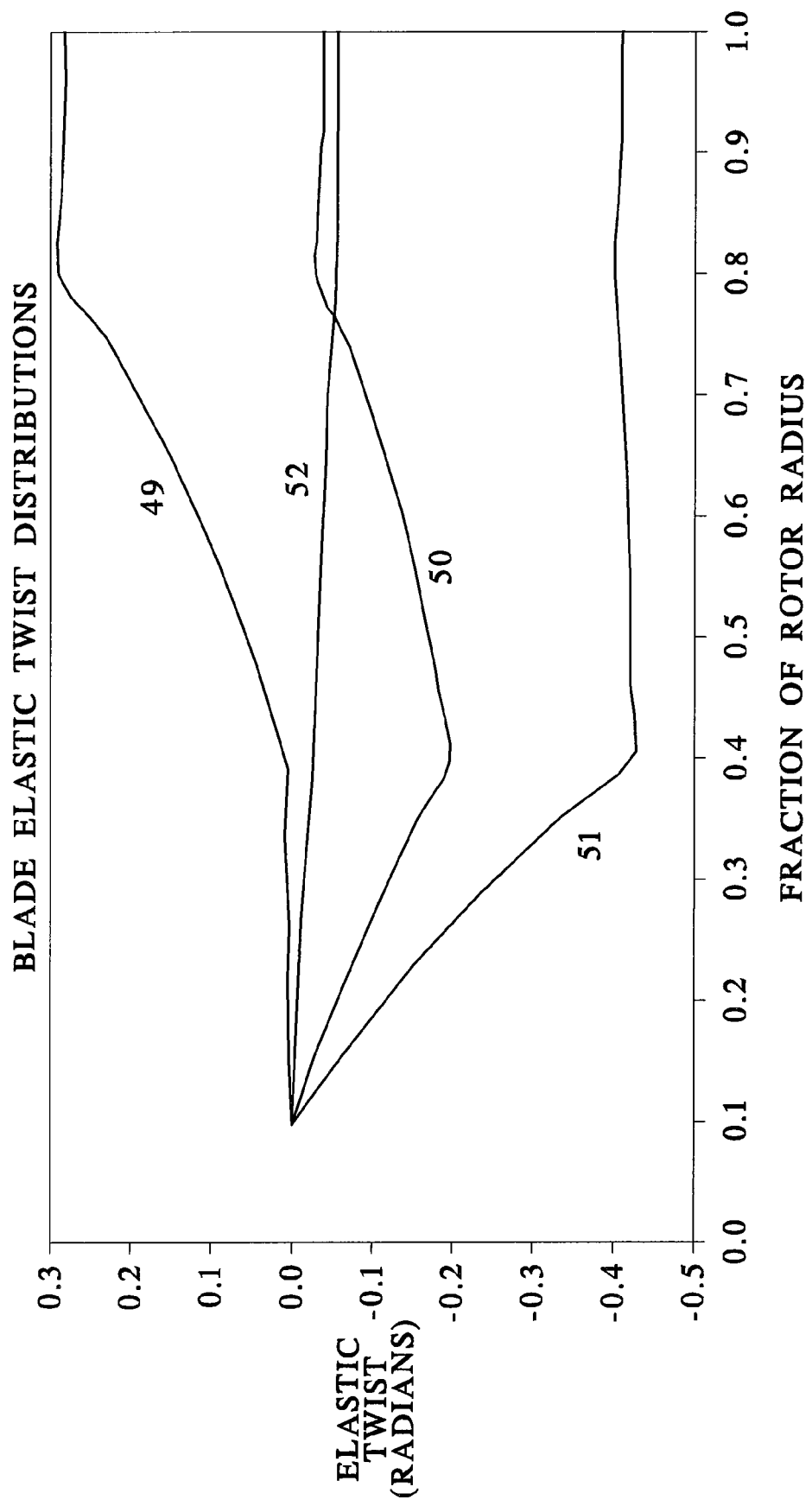
FIG. 11 is a plot of section elastic twist vs radial station, as produced by a rotor blade constructed in accordance with one embodiment of the present invention.

The physical mechanism which causes the incidence to vary as desired can be understood more fully with reference to FIG. 6 through FIG. 11. FIG. 6 shows the twist distribution, i.e. incidence relative to the hub, for hover 45, climb 46, dash 47, and loiter 48. FIGS. 7A through 10B respectively show the inner 10 and outer 11 inertial torquers in sectional view at each example operating condition. FIG. 11 shows the elastic-twist distributions (i.e., the difference between the built-in twist 36 and the twist distributions of FIG. 6) for hover 49, climb 50, dash 51, and loiter 52.

Loiter is flown at low rotor speed, so centrifugal twisting torques in this condition are weak, and the elastic twist 52 is small. Hence the blade body's built-in twist distribution 36 is made close to the ideal for loiter 35. Appropriate choice of hub incidence 44 then makes the incidence distribution in loiter 42 close to the ideal 31, as shown in FIG. 5. At each blade section, relative wind vectors 70, 74, composed of axial 68, 72 and tangential 69, 73 components, make desirably shallow angles of attack with the section chord lines 71, 75. Figure-of-merit is consequently close to ideal as listed in Table 2.

At the three other operating conditions, rotor speed is high, and the inertial torquers 10, 11 can generate substantial elastic twist. We consider first their effect in hover. In hover, hub pitch 38 is low. This puts the inner inertial torquer 10 at a small incidence angle 57 relative to the plane of rotation 13, so it generates little torque. However, the incidence 58 of the outer inertial torquer 11 is much larger, and negative, so it generates a substantial torque in the leading-edge-up direction. Hence, as plotted in FIG. 11, the blade flexes in the twist-reducing direction, particularly over the span between the inner and outer inertial torquers. The twist distribution 45 thus flattens relative to the built-in distribution 36. The incidence distribution 37 again comes out close to the ideal 28 in FIG. 5, with relative wind vectors 70 and 74 again making desirably shallow angles of attack with the section chord lines 71 and 75.

As the hub pitch is increased to the climb position 40, the incidence 59 of the inner inertial torquer 10 becomes more positive, and the incidence 60 of the outer inertial torquer 11 becomes less negative. Hence, the twisting torque and so blade flexure 50 are leading-edge-down over the inner part of the blade, and leading-edge-up over the middle part. Again, the overall incidence distribution 39 comes out close to the ideal 29, as does the corresponding figure-of-merit.

Further increase of hub pitch 6 to the dash position 42 makes the incidence 61 of the inner inertial torquer 10 still more positive, while bringing the incidence 62 of the outer inertial torquer 11 close to zero. Hence the twisting torque and blade flexure 51 are substantially leading-edge-down over the inner part of the blade, but close to zero over the outer part. Again, the incidence distribution 40 comes out close to the ideal 30, as does the figure-of-merit.

Hub-incidence control and flexural twist, mediated by inertial torquers, thus combine favorably to produce near-ideal blade incidence in equilibrium at multiple operating points.

The torsionally-flexible blades must also behave favorably in dynamic response. In particular, they must respond appropriately to cyclic variation of hub incidence 6, as is used for example in helicopters to generate pitching and rolling moments. A key criterion for satisfactory cyclic response is that the frequency of the blade's first torsional vibration mode must be at least somewhat larger than the spin rate Ω of the rotor. Many embodiments of the present invention satisfy this criterion. The torquer inertia required to achieve desired steady-state twist scales with blade-body torsional stiffness, so the ratio of inertia to stiffness, which primarily determines the blade's natural frequency in torsion, remains nearly constant over a broad stiffness range. Thus, in many embodiments the blade-body stiffness can be made quite low, and the torquer mass therefore can be made small compared with typical mass of the blade itself. It is however important that blade stiffness be sufficient to counter aerodynamic damping and anti-stiffness (which would arise if the aerodynamic centre of the blade were forward of the elastic axis 7).

A further requirement on dynamic behavior of the blade is that it be free from torsional flutter throughout the operating envelope. As is well known in the art, this typically can be achieved by arranging for the mass-centre of the blade to be forward of its elastic axis 7. The mass of one or more inertial torquers can be used to advantage in this respect. In various embodiments, they can be installed so that the mass centre of the overall blade assembly has an appropriate position relative to the elastic axis 7, while also providing the twisting torques necessary to achieve desired steady-state incidence distributions.

The embodiments that we have described are illustrative. Various embodiments can be implemented over a wide range of scale, Reynolds number, number of rotor blades, airfoil type, chord distribution and stiffness distribution. Embodiments apply beneficially to many types of aircraft, watercraft, and windmills.

The following numbers are generally used to indicate the components of the illustrated embodiments described herein:
1. rotor blade
2. rotation direction
3. spin axis
4. blade root 5. rotor hub
6. pitch hinge
7. elastic axis
8. blade tip
9. bob weight
10. inner inertial torquer assembly
11. outer inertial torquer assembly
12. bob weight strut
13. plane of rotation
14. inertial torquer principal axis of inertia
15. bob weight distance from elastic axis
16. inertial torquer principal-axis incidence relative to chord line
17. leading edge
18. trailing edge
19. axial velocity component
20. tangential velocity component
21. relative wind vector
22. twisting torque
23. blade section
24. section chord
25. root chord
26. tip chord
27. torsional stiffness distribution
28. ideal incidence distribution for hover
29. ideal incidence distribution for climb
30. ideal incidence distribution for dash
31. ideal incidence distribution for loiter
32. ideal twist distribution for hover
33. ideal twist distribution for climb
34. ideal twist distribution for dash
35. ideal twist distribution for loiter
36. built-in twist
37. actual incidence distribution for hover
38. hub incidence angle for hover
39. actual incidence distribution for climb
40. hub incidence angle for climb
41. actual incidence distribution for dash
42. hub incidence angle for dash
43. actual incidence distribution for loiter
44. hub incidence angle for loiter
45. actual twist distribution for hover
46. actual twist distribution for climb
47. actual twist distribution for dash
48. actual twist distribution for loiter
49. elastic twist distribution for hover
50. elastic twist distribution for climb
51. elastic twist distribution for dash
52. elastic twist distribution for loiter
53. inner weight principal axis of inertia
54. principal-axis relative incidence for inner torquer
55. outer weight principal axis of inertia
56. principal-axis relative incidence for outer torquer
57. incidence of inner torquer principal axis in hover
58. incidence of outer torquer principal axis in hover
59. incidence of inner torquer principal axis in climb
60. incidence of outer torquer principal axis in climb
61. incidence of inner torquer principal axis in dash
62. incidence of outer torquer principal axis in dash
63. leading bob mass
64. leading bob strut
65. trailing bob mass
66. trailing bob strut
67. normal to principal axis
68. axial velocity component at inner torquer
69. tangential velocity component at inner torquer
70. relative wind vector at inner torquer
71. chord line at inner torquer
72. axial velocity component at outer torquer
73. tangential velocity component at outer torquer
74. relative wind vector at outer torquer
75. chord line at outer torquer
76. measured section incidence at 0.82 R on test blade
77. predicted section incidence at 0.82 R on test blade.

It should thus be appreciated that the present invention provides in different embodiments: (a) a rotor blade; (b) a rotor including a rotor hub and at least one rotor blade; (c) a rotor including a rotor hub and a plurality of rotor blades; (d) an aircraft including a frame, a rotor hub supported by the frame, and at least one rotor blade; (e) an aircraft including a frame, a rotor hub supported by the frame, and a plurality of rotor blades; (f) a watercraft including a frame, a rotor hub supported by the frame, and at least one rotor blade; (g) a watercraft including a frame, a rotor hub supported by the frame, and a plurality of rotor blades; (h) a windmill including a frame, a rotor hub supported by the frame, and at least one rotor blade; and (i) a windmill including a frame, a rotor hub supported by the frame, and a plurality of rotor blades.

In various embodiments, one or more of the rotor blades includes an elongated body
  (i) having a root, a tip, a span from the root to the tip, and a spanwise axis extending between the root and the tip,
  (ii) having a leading edge, a trailing edge, and a chordwise axis extending between the leading edge and the trailing edge,
  (iii) being flexible in twist about the spanwise axis along at least some of the span,
  (iv) having a twist distribution across the span when in a state of rest, and
  (v) configured to be attachable at the root to a rotor hub.

The rotor hub is operable to spin the elongated body about an axis of rotation, with the axis of rotation being transverse to the spanwise axis, and to set a hub incidence of the elongated body, wherein the hub incidence is at an angle between a plane normal to the axis of rotation and a chordwise line through the root of the elongated body.

In various embodiments, one or more of the rotor blades also includes at least one inertial torquer attached to a station of the span of the elongated body and configured such that centrifugal effect on the at least one inertial torquer twists the elongated body such that the incidence distribution across the span of the elongated body varies with the rotational speed of the rotor hub about the axis of rotation and varies with the hub incidence of the elongated body, and in at least one operating condition of the rotor hub, a torsional equilibrium of the incidence distribution is substantially stiffened by the centrifugal effect on the at least one inertial torquer.

In various embodiments, one or more of the rotor blade includes a plurality of inertial torquers attached at radially-spaced positions along the elongated body; each of the inertial torquers includes at least one mass affixed at a designated distance from the spanwise axis; at least one of the masses are connected to the elongated body by at least one strut; at least one inertial torquer extends from opposite surfaces of the elongated body; each of the at least one inertial torquers includes at least one mass affixed at a designated distance from the spanwise axis; at least one of the masses of one of the inertial torquers are connected to the elongated body by at least one strut; the spanwise distribution of elongated body twist at the state of rest is approximately ideal for generation of thrust in an operating condition with a low rotational speed of the rotor hub about the spin axis; each of the inertial torquers is attached to the elongated body, and configured with its moments of inertia about the spanwise axis and the angle of its principal axes of inertia relative to the chord line of the station, such that the incidence distribution varies with the spin rate and hub pitch of the elongated body so as to maintain efficient generation of thrust throughout a flight envelope of the rotor; at least one of the inertial torquers has a mass centre located forward of the spanwise axis; at least one inertial torquers has a streamlined configuration to minimize aerodynamic drag; the torsional stiffness of the elongated body, the inertia of the at least one inertial torquers, and the position of the spanwise axis relative to the aerodynamic centre of the elongated body, are such that when installed and spinning in a rotor, the lowest natural frequency of the elongated body when oscillating in torsion is faster than the spin frequency of the rotor; at least one of the inertial torquers has a mass center located forward of the spanwise axis; and combinations thereof.

It should be understood that various changes and modifications to our illustrative embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A rotor blade comprising:
   (A) an elongated body
      (a) having a root, a tip, a span from the root to the tip, and a spanwise axis extending between the root and the tip,
      (b) having a leading edge, a trailing edge, and a chordwise axis extending between the leading edge and the trailing edge,
      (c) being flexible in twist about the spanwise axis along at least some of the span,
      (d) having a twist distribution across the span when in a state of rest, and
      (e) configured to be attachable at the root to a rotor hub which is operable
         (i) to spin the elongated body about an axis of rotation, said axis of rotation being transverse to the spanwise axis, and
         (ii) to variably set a hub incidence angle of the elongated body, said hub incidence angle being the angle between a plane normal to said axis of rotation and a root chordwise line, the root chordwise line being a chordwise line through the root of the elongated body; and
   (B) an inertial torquer attached to a station of the span of the elongated body, the inertial torquer:
      (a) having a moment of inertia and a principal axis of inertia,
      (b) including a first section and a second section positioned coaxially along said principal axis of inertia,
         (i) the first section having a first axis positioned along said principal axis of inertia,
         (ii) the second section having a second axis positioned along said principal axis of inertia,
      (c) including a first mass attached to the first section, and a second mass attached to the second section,
         (i) the first mass extending at a first designated distance from the spanwise axis of the elongated body,
         (ii) the second mass extending at a second designated distance from the spanwise axis of the elongated body,
         (iii) the first mass and the second mass extending from opposite surfaces of the elongated body,
      (d) positioned with said moment of inertia about said spanwise axis and with said principal axis of inertia angled relative to a station chordwise line, said station chordwise line being a chordwise line extending between the leading edge and the trailing edge of the elongated body at said station,
      (e) defining a first relative incidence angle, said first relative incidence angle being the angle between said station chordwise line and said first axis,
      (f) defining a second relative incidence angle, said second relative incidence angle being the angle between said station chordwise line and said second axis,
      (g) positioned such that said first relative incidence angle and said second relative incidence angle are each less than ninety degrees, and
      (h) configured such that
         (i) the centrifugal effect on the inertial torquer twists the elongated body such that the incidence distribution across the span of the elongated body varies with the rotational speed of the rotor hub about said axis of rotation and varies with said hub incidence angle of the elongated body, and
         (ii) in at least one operating condition of the rotor hub, a torsional equilibrium of the incidence distribution is substantially stiffened by the centrifugal effect on the inertial torquer.

2. The rotor blade of claim 1, which includes a plurality of the inertial torquers attached at radially-spaced positions along the elongated body.

3. The rotor blade of claim 2, wherein at least one of the first mass and the second mass is connected to the elongated body by at least one strut.

4. The rotor blade of claim 1, wherein at least one of the first masses and the second mass of the inertial torquer is connected to the elongated body by at least one strut.

5. The rotor blade of claim 1, wherein the rotor hub is capable of spinning the rotor blade about the spin axis at a first rotational speed and a second rotational speed, the first rotational speed being lower than the second rotational speed, the spanwise distribution of the elongated body twist at the state of rest being configured to maximize the generation of thrust at the first rotational speed.

6. The rotor blade of claim 1, said incidence distribution being variable, said variable incidence distribution varying with the spin rate and hub pitch of the elongated body so as to maximize thrust efficiency of the rotor.

7. The rotor blade of claim 1, wherein the inertial torquer has a mass center located forward of said span-wise axis.

8. The rotor blade of claim 1, wherein said inertial torquer has a streamlined configuration to minimize aerodynamic drag.

9. The rotor blade of claim 1, wherein the torsional stiffness of the elongated body, the inertia of the inertial torquer, and the position of said span-wise axis relative to the aerodynamic center of the elongated body, are such that when installed and spinning in a rotor, the lowest natural frequency of the elongated body when oscillating in torsion is faster than the spin frequency of the rotor.

10. The rotor blade of claim 1, wherein the rotor hub variably sets the hub incidence angle of the elongated body in a collective or cyclical manner.

11. The rotor blade of claim 1, wherein the rotor hub variably sets the hub incidence angle of the elongated body in both a collective and cyclical manner.

12. The rotor blade of claim 1, wherein the masses of said first mass and said second mass are different.

13. The rotor blade of claim 1, wherein the first designated distance and the second designated distance are different.

14. The rotor blade of claim 1, wherein the inertial torquer has a mass center located behind said spanwise axis.

15. A rotor comprising:
   a rotor hub; and
   at least one rotor blade including:
   (A) an elongated body
      (a) having a root, a tip, a span from the root to the tip, and a span wise-axis extending between the root and the tip,
      (b) having a leading edge, a trailing edge, and a chordwise axis extending between the leading edge and the trailing edge,
      (c) being flexible in twist about the span wise axis along at least some of the span,
      (d) having a twist distribution across the span when in a state of rest, and
      (e) attached at the root to the rotor hub which is operable
         (i) to spin the elongated body about an axis of rotation, said axis of rotation being transverse to the spanwise axis, and
         iii) to variably set a hub incidence angle of said elongated body, said hub incidence angle being an angle between a plane normal to said axis of rotation and a root chordwise line, the root chordwise line being a chordwise line through the root of the elongated body, and
   (B) an inertial torquer attached to a station of the span of the elongated body, the inertial torquer:
      (a) having a moment of inertia and a principal axis of inertia,
      (b) including a first section and a second section positioned coaxially along said principal axis of inertia,
         (i) the first section having a first axis positioned along said principal axis of inertia,
         (ii) the second section having a second axis positioned along said principal axis of inertia,
      (c) including a first mass attached to the first section, and a second mass attached to the second section,
         (i) the first mass extending at a first designated distance from the spanwise axis of the elongated body,
         (ii) the second mass extending at a second designated distance from the spanwise axis of the elongated body,
         (iii) the first mass and the second mass extending from opposite surfaces of the elongated body,
      (d) positioned with said moment of inertia about said spanwise axis and with said principal axis of inertia angled relative to a station chordwise line, said station chordwise line being a chordwise line extending between the leading edge and the trailing edge of the elongated body at said station,
      (e) defining a first relative incidence angle, said first relative incidence angle being the angle between said station chordwise line and said first axis,
      (f) defining a second relative incidence angle, said second relative incidence angle being the angle between said station chordwise line and said second axis,
      (g) positioned such that said first relative incidence angle and said second relative incidence angle are each less than ninety degrees, and
      (h) configured such that
         (i) the centrifugal effect on the inertial torquer twists the elongated body such that the incidence distribution across the span of the elongated body varies with the rotational speed of the rotor hub about said axis of rotation and varies with said hub incidence angle of the elongated body, and
         (ii) in at least one operating condition of the rotor hub, a torsional equilibrium of the incidence distribution is substantially stiffened by the centrifugal effect on the inertial torquer.

16. The rotor of claim 15, which includes a plurality of the inertial torquers attached at radially-spaced positions along the elongated body.

17. The rotor of claim 16, wherein at least one of the first mass and the second mass is connected to the elongated body by at least one strut.

18. The rotor of claim 15, wherein at least one of the first mass and the second mass of the inertial torquer is connected to the elongated body by at least one strut.

19. The rotor of claim 15, wherein the rotor hub is capable of spinning the rotor blade about the spin axis at a first rotational speed and a second rotational speed, the first rotational speed being lower than the second rotational speed, the spanwise distribution of elongated body twist at the state of rest being configured to maximize the generation of thrust at the first rotational speed.

20. The rotor of claim 15, said incidence distribution being variable, said variable incidence distribution varying with the spin rate and hub pitch of the elongated body so as to maximize of thrust efficiency of the rotor.

21. The rotor of claim 15, wherein the inertial torquer has a mass center located forward of said spanwise axis.

22. The rotor of claim 15, wherein the inertial torquer has a streamlined configuration to minimize aerodynamic drag.

23. The rotor of claim 15, wherein the torsional stiffness of the elongated body, the inertia of the inertial torquer, and the position of said spanwise axis relative to the aerodynamic center of the elongated body, are such that when installed and spinning, the lowest natural frequency of the elongated body when oscillating in torsion is faster than the spin frequency of the rotor.

24. The rotor of claim 15, wherein the rotor hub is configured to vary said hub incidence angle of the elongated body cyclically once per rotor revolution.

25. The rotor of claim 15, wherein the rotor hub variably sets the hub incidence angle of the elongated body in a collective or cyclical manner.

26. The rotor of claim 15, wherein the rotor hub variably sets the hub incidence angle of the elongated body in both a collective and cyclical manner.

27. The rotor of claim 15, wherein the masses of said first mass and said second mass are different.

28. The rotor of claim 15, wherein the first designated distance and the second designated distance are different.

29. The rotor of claim 15, wherein the inertial torquer has a mass center located behind said spanwise axis.

30. An aircraft comprising:
   a frame;
   a rotor hub supported by the frame; and
   at least one rotor blade having:
   (A) an elongated body
      (a) having a root, a tip, a span from the root to the tip, and a spanwise axis extending between the root and the tip, (b) having a leading edge, a trailing edge, and a chordwise axis extending between the leading edge and the trailing edge,
(c) being flexible in twist about the spanwise axis along at least some of the span,
(d) having a twist distribution across the span when in a state of rest, and
(e) attached at the root to the rotor hub which is operable
  (i) to spin the elongated body about an axis of rotation, said axis of rotation being transverse to the spanwise axis, and
  (ii) to variably set a hub incidence angle of the elongated body, said hub incidence angle being an angle between a plane normal to said axis of rotation and a root chordwise line, the root chordwise line being a chordwise line through the root of the elongated body; and
(B) an inertial torquer attached to a station of the span of the elongated body, the inertial torquer:
  (a) having a moment of inertia and a principal axis of inertia,
  (b) including a first section and a second section positioned coaxially along said principal axis of inertia,
    (i) the first section having a first axis positioned along said principal axis of inertia,
    (ii) the second section having a second axis positioned along said principal axis of inertia,
  (c) including a first mass attached to the first section, and a second mass attached to the second section,
    (i) the first mass extending at a first designated distance from the spanwise axis of the elongated body,
    (ii) the second mass extending at a second designated distance from the spanwise axis of the elongated body,
    (iii) the first mass and the second mass extending from opposite surfaces of the elongated body,
  (d) positioned with said moment of inertia about said spanwise axis and with said principal axis of inertia angled relative to a station chordwise line, said station chordwise line being a chordwise line extending between the leading edge and the trailing edge of the elongated body at said station,
  (e) defining a first relative incidence angle, said first relative incidence angle being the angle between said station chordwise line and said first axis,
  (f) defining a second relative incidence angle, said second incidence angle being the angle between said station chordwise line and said second axis,
  (q) positioned such that said first relative incidence angle and said second relative incidence angle are each less than ninety degrees, and
  (h) configured such that
    (i) centrifugal effect on the inertial torquer twists the elongated body such that the incidence distribution across the span of the elongated body varies with the rotational speed of the rotor hub about said axis of rotation and varies with said hub incidence angle of the elongated body, and
    (ii) in at least one operating condition of the rotor hub, a torsional equilibrium of the incidence distribution is substantially stiffened by the centrifugal effect on the inertial torquer.

31. The aircraft of claim 30, which includes a plurality of the inertial torquers attached at radially spaced positions along the elongated body.

32. The aircraft of claim 31, wherein at least one of the first mass and the second mass is connected to the elongated body by at least one strut.

33. The aircraft of claim 30, wherein at least one of the first mass and the second mass of the inertial torquer is connected to the elongated body by at least one strut.

34. The aircraft of claim 30, wherein the rotor hub is capable of spinning the rotor blade about the spin axis at a first rotational speed and a second rotational speed, the first rotational speed being lower than the second rotational speed, the spanwise distribution of elongated body twist at the state of rest being configured to maximize the generation of thrust at the first rotational speed.

35. The aircraft of claim 30, said incidence distribution being variable, said variable incidence distribution varying with the spin rate and hub pitch of the elongated body so as to maximize thrust efficiency of the rotor.

36. The aircraft of claim 30, wherein the inertial torquer has a mass center located forward of said spanwise axis.

37. The aircraft of claim 30, wherein the inertial torquer has a streamlined configuration to minimize aerodynamic drag.

38. The aircraft of claim 30, wherein the torsional stiffness of the elongated body, the inertia of the inertial torquer, and the position of said spanwise axis relative to the aerodynamic center of the elongated body, are such that when installed and spinning, the lowest natural frequency of the elongated body when oscillating in torsion is faster than the spin frequency of the rotor.

39. The aircraft of claim 30, wherein the rotor hub is configured to vary said hub incidence angle of the elongated body cyclically once per rotor revolution.

40. The aircraft of claim 30, wherein the rotor hub variably sets the hub incidence angle of the elongated body in a collective or cyclical manner.

41. The aircraft of claim 30, wherein the rotor hub variably sets the hub incidence angle of the elongated body in both a collective and cyclical manner.

42. The aircraft of claim 30, wherein the masses of said first mass and said second mass are different.

43. The aircraft of claim 30, wherein the first designated distance and the second designated distance are different.

44. The aircraft of claim 30, wherein the inertial torquer has a mass center located behind said spanwise axis.

45. A windmill comprising:
a frame;
a rotor hub supported by the frame; and
at least one rotor blade having:
  (A) an elongated body
    (a) having a root, a tip, a span from the root to the tip, and a spanwise axis extending between the root and the tip,
    (b) having a leading edge, a trailing edge, and a chordwise axis extending between the leading edge and the trailing edge,
    (c) being flexible in twist about the spanwise axis along at least some of the span,
    (d) having a twist distribution across the span when in a state of rest, and
    (e) attached at the root to the rotor hub which is operable
      (i) to spin the elongated body about an axis of rotation, said axis of rotation being transverse to the spanwise axis, and
      (ii) to variably set a hub incidence angle of the elongated body, said hub incidence angle being the angle between a plane normal to said axis of rotation and a root chordwise line, the root chordwise line being a chordwise line through said root of the elongated body; and (B) an inertial torquer attached to a station of the span of the elongated body, the inertial torquer:
  (a) having a moment of inertia and a principal axis of inertia,
  (b) including a first section and a second section positioned coaxially along said principal axis of inertia,
    (i) the first section having a first axis positioned along said principal axis of inertia,
    (ii) the second section having a second axis positioned along said principal axis of inertia,
  (c) including a first mass attached to the first section, and a second mass attached to the second section,
    (i) the first mass extending at a first designated distance from the spanwise axis of the elongated body,
    (ii) the second mass extending at a second designated distance from the spanwise axis of the elongated body,
    (iii) the first mass and the second mass extending from opposite surfaces of the elongated body,
  (d) positioned with said moment of inertia about said spanwise axis and with said principal axis of inertia angled relative to a station chordwise line, said station chordwise line being a chordwise line extending between the leading edge and the trailing edge of the elongated body at said station,
  (e) defining a first relative incidence angle, said first relative incidence angle being the angle between said station chordwise line and said first axis,
  (f) defining a second relative incidence angle, said second relative incidence angle being the angle between said station chordwise line and said second axis,
  (q) positioned such that said first relative incidence angle and said second relative incidence angle are each less than ninety degrees, and
  (h) configured such that
    (i) the centrifugal effect on the inertial torquer twists the elongated body such that the incidence distribution across the span of the elongated body varies with the rotational speed of the rotor hub about said axis of rotation and varies with the hub incidence angle of the elongated body, and
    (ii) in at least one operating condition of the rotor hub, a torsional equilibrium of the incidence distribution is substantially stiffened by the centrifugal effect on the inertial torquer.

46. The windmill of claim 45, which includes a plurality of the inertial torquers attached at radially spaced positions along the elongated body.

47. The windmill of claim 46, wherein at least one of the first mass and the second mass is connected to the elongated body by at least one strut.

48. The windmill of claim 45, wherein at least one of the first mass and the second mass of the inertial torquer is connected to the elongated body by at least one strut.

49. The windmill of claim 45, wherein the rotor hub is capable of spinning the rotor blade about the spin axis at a first rotational speed and a second rotational speed, the first rotational speed being lower than the second rotational speed, the spanwise distribution of elongated body twist at the state of rest being configured to maximize generation of thrust at the first rotational speed.

50. The windmill of claim 45, said incidence distribution being variable, said variable incidence distribution varying with the spin rate and hub pitch of the elongated body so as to maximize thrust efficiency of the rotor.

51. The windmill of claim 45, wherein the inertial torquer has a mass center located forward of said spanwise axis.

52. The windmill of claim 45, wherein the inertial torquer has a streamlined configuration to minimize aerodynamic drag.

53. The windmill of claim 45, wherein the torsional stiffness of the elongated body, the inertia of the inertial torquer, and the position of said spanwise axis relative to the aerodynamic center of the elongated body, are such that when installed and spinning, the lowest natural frequency of the elongated body when oscillating in torsion is faster than the spin frequency of the rotor.

54. The windmill of claim 45, wherein the rotor hub is configured to vary said hub incidence angle of the elongated body cyclically once per rotor revolution.

55. The windmill of claim 45, wherein the rotor hub variably sets the hub incidence angle of the elongated body in a collective or cyclical manner.

56. The windmill of claim 45, wherein the rotor hub variably sets the hub incidence angle of the elongated body in both a collective and cyclical manner.

57. The windmill of claim 45, wherein the masses of said first mass and said second mass are different.

58. The windmill of claim 45, wherein the first designated distance and the second designated distance are different.

59. The windmill of claim 45, wherein the inertial torquer has a mass center located behind said spanwise axis.

* * * * *